Nov. 3, 1970

W. C. McCARTHY ET AL 3,537,679

CRANKCASE DRAIN APPARATUS

Filed Nov. 12, 1969

INVENTOR.
WILLIAM C. McCARTHY
EVARISTO BULNES

BY

ATTORNEY

Nov. 3, 1970   W. C. McCARTHY ET AL   3,537,679
CRANKCASE DRAIN APPARATUS
Filed Nov. 12, 1969   2 Sheets-Sheet 2
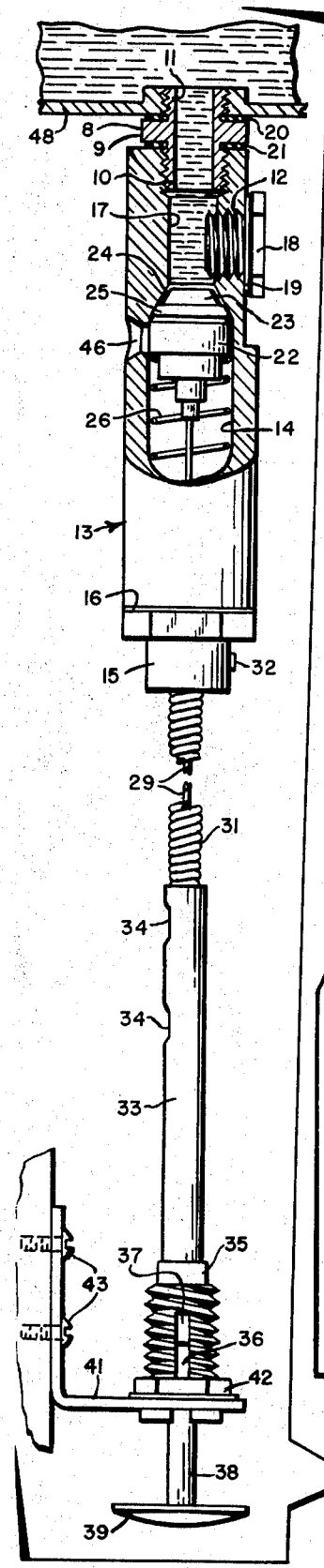
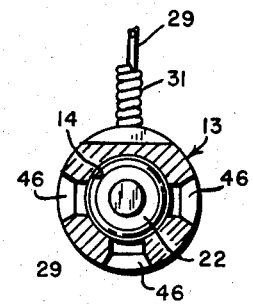
Fig. 5
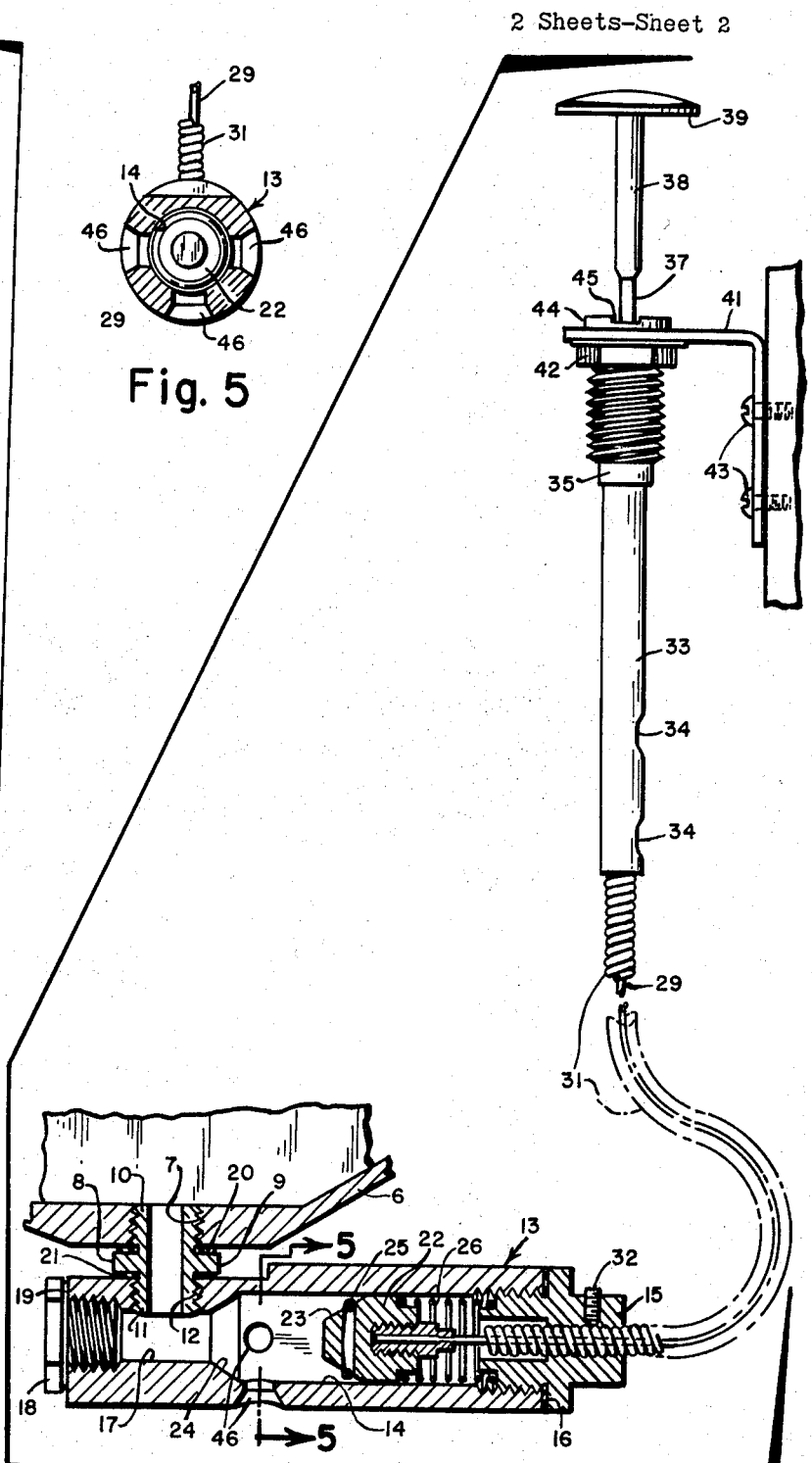
Fig. 6
Fig. 4
INVENTOR.
WILLIAM C. McCARTHY
EVARISTO BULNES
BY
ATTORNEY ID 3,537,679
CRANKCASE DRAIN APPARATUS
William C. McCarthy, 12000 NE. 16th Ave H-812 33161, and Evaristo Bulnes, 8511 SW. 27th St. 33155, both of Miami, Fla.
Filed Nov. 12, 1969, Ser. No. 875,737
Int. Cl. F16k 51/00
U.S. Cl. 251—144                                      7 Claims

ABSTRACT OF THE DISCLOSURE

A device including a valve for connection in the drain opening of the crankcase of an automobile for use in draining oil from it, the valve being operable, through a cable connected to a remote operator preferably on the dashboard of a vehicle. The valve is provided with an entrance port and a plurality of discharge ports and a valve member normally sealing the oil against drainage from the crankcase, the valve member dwelling intermediate the ports, but operable by the cable means upon an application of a pulling force to shift the valve member to an open position so that used crankcase oil can drain, without the need of crawling under the vehicle to open the crankcase drain opening.

---

This invention relates to the art of drainage devices and is concerned particularly with the provision of a device intended for operation in association with the crankcase of an automobile for drainage purposes.

In the past there have been improvements in automobiles including better engines, greater horsepower and flexibility. However, the same method is being used for the removal of used engine oil in spite of warranties, guaranties and other assurances; and it is still necessary to place the automobile on a hydraulic lift for the removal of oil and to pay a high price for fresh oil. Use of jacks or other suports are risky and serious injury or death can result in the event of an accident. Now this device povides an inexpensive structure for use in changing oil. The device is easily and quickly installed so that any motorist can use it at a savings of substantial amount in the cost of motor oil which can be changed while the car is at ground level, simply by moving a handle or operator to an open or a drain position. To do this a simple reliable valve is actuated by means of a flexible cable which moves a valve member relative to a valve housing to a draining position for the oil. A simple twist of the wrist closes the valve and fresh oil may be simply introduced into the engine in the conventional manner. The simplicity of the device provides for ready changing of oil without the requirement of taking the vehicle to a station thus tending to prolong engine life and to promote better gasoline mileage and fewer replacement parts. Once installed on a vehicle, a substantial saving of money is obtained because of reduced cost for oil changes. This valve may be moved from car to car and the benefits which are described hereinafter may be extended.

A particular object of the invention is, therefore, to provide an operating mechanism for the said valve which is effective to maintain or to hold the valve in an open position during oil drainage against the normal bias of a spring which maintains the valve in a normal sealing position.

Yet another object of the invention is to provide in a device of the character noted, a valve actuated by a plunger with which plunger is associated an operating flexible cable that extends to a convenient location with respect to the engine and through the medium of which the valve is adapted to be shifted to an open or drain position for the drainage of the crankcase and means at the upper end of the cable for locking the valve in the open position against a normal bias of a coil spring tending to close the valve and to keep it closed.

Various other novel features of construction and operation of the device will be more clearly apparent during the course of the following description, reference being made to the accompanying drawings wherein there has been illustrated a preferred form of the device and wherein like reference characters of reference are employed to denote like parts throughout the several figures.

FIG. 4 is a view partly in section and partly in elevation and showing the valve of FIG. 2 in the open or drain position, FIG. 5 is a transverse section through the housing, similar to that of FIG. 3, taken on line 5—5 of FIG. 4; and FIG. 6 illustrates an alternative installation of the device.

Figure 1:
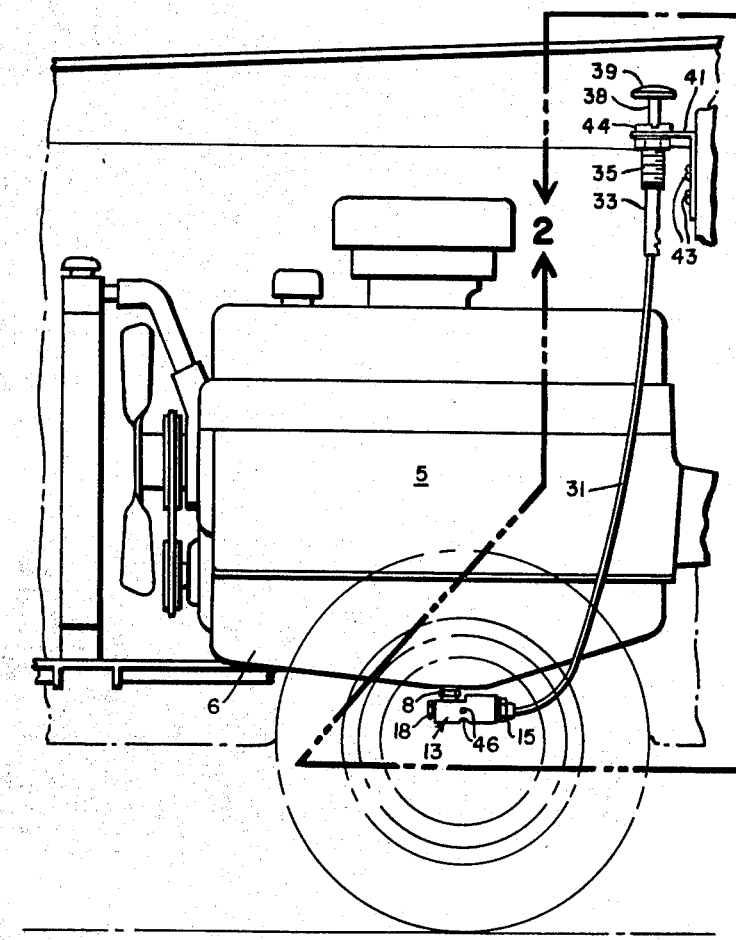
FIG. 1 is a side elevation of an internal combustion engine.
Figure 2:
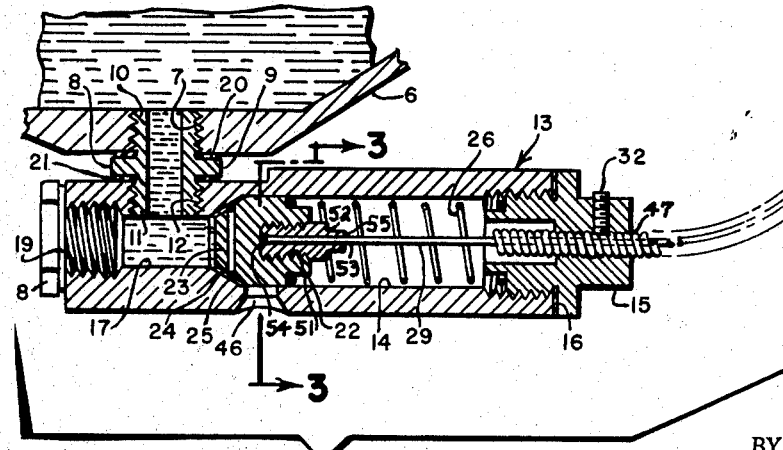
FIG. 2 is a view partly in section and partly in elevation of the drainage device embodied in the invention and illustrating a valve closed position.

Referring specifically to the drawings and particularly to FIGS. 1 through 4 inclusive, an internal combustion engine 5 is provided with the usual chankcase 6 that is apertured and, see FIG. 2, threaded at 7 to receive a plug or, when this invention is used, an adapter 8. The adapter 8 is externally threaded at its opposite nipple ends 10 and 11; and it is preferably provided, intermediate its length, with a hexagonal flange 9, whereby the adapter may be tightly engaged into the threaded opening 7 by a wrench or the like. The lower nipple 11 is in threaded engagement in a threaded opening 12 in one side of the valve housing, which housing is to be described hereinafter. The adapter is axially bored for the passage of oil from the crankcase 6 in a manner to be presently described.

Figure 3:
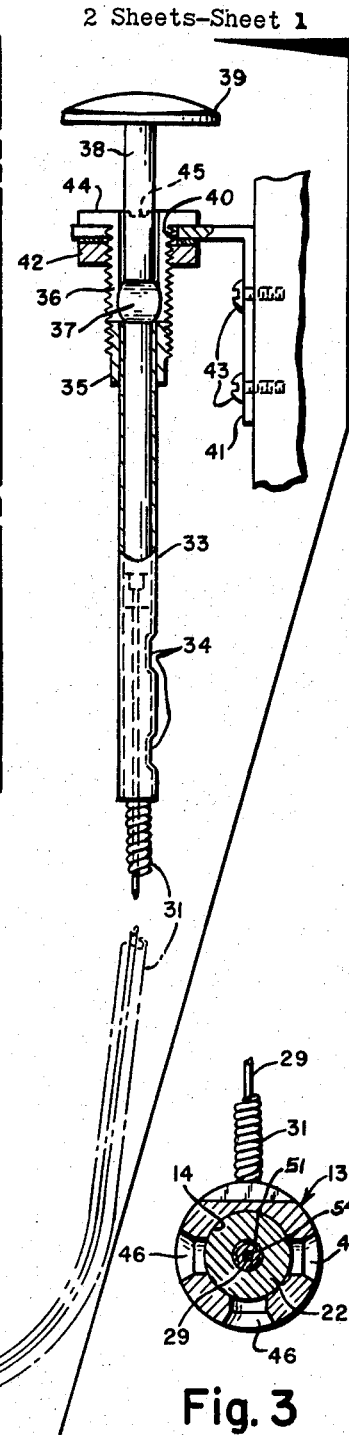
FIG. 3 is a cross-sectional view of the valve housing, taken on the line 3—3 and looking in the direction of the arrows.

The valve housing 13 which is generally cylindrical in cross section, as seen in FIG. 3, is provided with an axial cylindrical through bore 14, that is closed at one end by a threaded plug 15 in sealing engagement with respect to the valve housing 13; and it may be provided with a gasket 16. The bore passage 14 is of reduced diameter intermediate the ends as indicated by the numeral 17; and the reduced end portion 17 of the passage is closed by a plug 18, which is preferably provided with a gasket 19. Preferably, the adapter 8 which is employed in the preferred embodiment of the invention is also sealed with respect to the crankcase and the valve housing 13 by a gasket 20 and 21.

Slidably and snugly positioned within the through bore 14 of the valve housing, there is a valve member 22 having a tapered leading nose or end 23 which matingly and sealingly engages a valve seat 24 in the bore passage 14, the nose being provided with an O-ring 25 intermediate the seat surface of the nose or end 23, and the valve seat 24 to form a positive seal against the flow of oil from the crankcase 6 through the adapter and housing. In the preferred embodiment, an annular seat is provided on the inclined or conical surface of the valve member so that the O-ring 25 and the valve member 22 may be assembled prior to insertion into the housing. The valve member 22 is biased in a direction toward the seat 24 by a coil spring 26. In a preferred embodiment, an O-ring not shown may be circumposed about the valve member 22 and carried within a peripheral groove not shown in the surface of the valve member which faces the wall of the bore or passage 14, so that when the valve member 22 is in a retracted position, it provides a seal against passage of oil to the plug end 15 of the housing.

The valve member 22 is connected to one end of a wire or cable 29 with the wire extending through a flexible tubular cable housing 31. One end of the cable housing 31 is secured to the plug 15 as by a set screw 32 or otherwise stated, a cable length holding and length adjustment means. The cable housing 31, from the plug 15 extends upwardly to a remote position with respect to the valve housing 13 is fitted into a tubular sleeve 33 and capitivated in an axial position with respect thereto by indentations 34 at the lower end of the sleeve or shell 33. The upper end of the sleeve 33 is soldered or otherwise connected onto the lower end of a bushing 35 that is longitudinally slotted in the distal or terminal end in the opposite sides with the slots extending from that end depthwise, as indicated at 36, to receive a flat key 37, carried by a stem 38. The stem is provided with an operating handle or button 39 at the terminal end and is connected to the wire or cable 29 at the extending end of it. For mounting the operator button 39, for instance to the dashboard of a vehicle, a mounting bracket 41 is provided. The bushing 35 is sized for receipt in an opening 40 of the bracket 41, and is clamped to it by suitable clamping means, such as the lock nut 42 that is threaded upon the bushing 35. The bracket 41 may be fixed to any desirable part of the automobile, shown particularly in FIG. 2, by clamping screws 43 and the positioning of the bracket 41 is preferably remote from the valve housing 13 and located in a position upon any part of the vehicle which is convenient so that a person will not be obliged to crawl beneath the vehicle to drain the oil.

For the purpose of holding the valve in a drain or valve open position, against the normal bias of spring 26, that is while oil is being drained from the crankcase, holding means are provided which in the preferred embodiment are as follows. The terminal end face of a bushing 35, which, because of the slots 36, constitute opposite segments of a head 44 are each provided with a notch as at 45 in FIG. 4. This notch provides a seat to receive the key 37, after the operator handle or button 39 has been pulled to the extended position shown in FIG. 2, and the key rotated about the longitudinal axis of the stem through 90°, so that the enlarged key 39 is withdrawn from and no longer mates with the slots 36, but, rather, rests in the notch 45 where it is held by the bias of the spring 26. In this position, with the stem pulled away from the bushing 35, the wire 29 is shifted longitudinally within the cable housing 31 and the valve member 22 is pulled away from the seat 24. The key will remain nested within the notch 45 until the oil from the crank has been completely drained.

Referring again to the valve, the valve housing 13 is provided with drain openings 46 preferably arranged in a pattern at an axial position in the housing adjacent the valve seat 24 and between the valve seat and the plug 15. These openings communicate with the bore passageway 14 as seen in FIG. 2, for instance. Also, the inner end of the plug 15 is provided with a breather or vent opening to facilitate smooth operation of opening and closing of the valve; in the embodiment shown, there being a slight difference in diameter between the cable housing 31 and the diameter of the bore 47 which provides for such venting.

Referring to FIG. 6, it is seen that the drain device may be employed in various types of crankcase structures, such as one in which the drain opening is in the side wall, instead of the floor. In such an installation, the valve housing 13 is connected to the drain opening in the following manner. The plug 18 and the adapter 8 are removed from the housing and their positions reversed, that is, the adapter is replaced by the plug and the plug is replaced by the adapter, whereby the flow of fluid from the crankcase in the embodiment shown in FIG. 6 is through the crankcase wall 48 from whence it flows directly into the reduced end of the bore 17. All other parts of the device remain identical except that the flow is in an axial line with respect to the valve housing or casing 13. The oil drains outwardly through the port 46, when the valve member 22 is shifted to a drain position, the same as shown in FIG. 4.

With respect to the connection of the valve member 22 and the end of the cable or wire 29, as is seen in FIGS. 2 and 4, that the valve member may be provided with a threaded recess 51 to receive a threaded connector 52 having a socket 53 into which the end 54 of the wire is passed and in which that end is secured as by crimping the slightly deformable portion 55 circumposed about the end portion of the wire.

It will be apparent from the foregoing that an improved drain device has been provided which is useful in various types of crankcases which require draining and that the device simplifies the attachment of it to the crankcase of a vehicle, the preferred adapter or nipple having a threaded external diameter compatible with the crankcase opening threads of the vehicle on which it is to be installed. The device provides for the remote operation of the valve member to permit the user to drain the crankcase by merely pulling upon the button operator or handle 39 which pulls upon the wire or cable 29 and shifts the valve member 22 to the open position against the bias of the spring 26. It is seen that the valve member, the recess within which it is operable, and the wire and its connection are all arranged symmetrically with respect to and operably coincident with the axis of the valve for smooth operation of the mechanism. The parts and construction of the device are simple and of a reduced number; it is easily installed; the parts are relatively inexpensive to manufacture and effectively combined as a drainage valve device that is operable from a position remote from the crankcase, such as a position inside the cab of a vehicle.

What is claimed is:

1. For use in draining oil from the crankcase of an engine having a threaded drain in the lower portion,
   (A) a valve device comprising: (a) a valve member, and (b) an elongtae valve housing,
   (B) said housing having a through recess defined by a first and a second aligned bore, one in each end of the housing, said second bore having a larger diameter than said first bore, and defining a valve seat shoulder at the juncture of said bores,
   (C) said second bore being sized to snugly and slidably receive said valve member, and said valve member being in said second bore,
   (D) said valve housing having internally threaded walls about both ends of said recess, a first threaded plug, a second threaded plug in the end of said second bore, said second plug having a through axial bore,
   (E) an inlet and an outlet port means in fluid communication with said recess composed of (a) a first opening in said valve housing in open communication with said first bore, and (b) a plurality of openings through said valve housing in fluid communication with said second bore and arranged in a pattern about said housing at a common axial position which is intermediate said second plug and said seat, said first threaded plug being sized for threaded engagement in both the end of said first bore and said first opening,
   (F) threaded adapter means including nipple means sized for threaded engagement in the threaded drain,
   (G) said valve member being slidably captivated in the second bore and including a truncated, cone-shaped valve face sized to sealingly engage said seat and normally dwelling on said seat effective to prevent drainage of oil from the crankcase,
(H) spring means in the second bore normally urging the valve member into a sealed position (a) toward said seat wtih the valve face in sealing engagement with the seat, and (b) away from the second plug,
(I) cable means to move the valve member in the second bore against the spring bias from said sealed position toward the second plug to an open position intermediate the second plug and the plurality of openings, said cable means comprising:
(J) a length of cable and a length of coaxial tubular housing, said cable extending outwardly from the opposite ends of said cable housing,
(K) means connecting said cable means to said valve device in the hole of the second plug with one of the extending ends of the cable extending into the second bore, and
(L) means connecting the end of the cable extending into the second bore to said valve member,
(M) cable holding means fixed to the other end of the cable and cable housing, said cable holding means comprising:
(N) a sleeve including a bracket for mounting at a remote point from the crankcase, and holding means to hold the end of the cable housing with the cable extending into said sleeve, and
(O) a plunger having an inner end at all times in the sleeve and connected to the distal end of said cable, and an outer end at all times extending out of said sleeve, whereby the cable may be shifted axially within the cable housing by axial movement of the plunger relative to the sleeve to control the axial position of the valve member within the valve housing,
(P) said second plug including means to secure the cable housing to said second plug, and
(Q) said second plug, said valve member, recess, seat and sealing means each having a common axis and each being symmetrically arranged with respect to that axis for a smooth operation of said valve member in said second bore on pulling movement of said cable relative to said cable housing to shift the valve member from the sealing position to the valve open position.

2. The device as set forth in claim 1 wherein said adapter means comprises a member having oppositely extending nipples, with one of said nipples being adapted to be threadably received in the threaded opening, and the other of said nipples is in fitted engagement in said first opening.

3. The device as set forth in claim 2 wherein the nipple of said adapter means in the said first opening in said valve housing is of the same diameter as the diameter of the threaded opening of the end of the said first bore, and the diameter of said first threaded plug, the common size diameter accommodating interchangeability of said first plug and said adapter.

4. The device as set forth in claim 1 wherein said means to secure in said second plug also includes means for axial adjustment of the cable housing to facilitate adjustment of the length of the cable housing between the sleeve and the second plug, said means to secure the axial position of the cable housing and to adjust the position of the cable housing comprising a set screw in a threaded radial bore communicating between the surface of the second plug and the hole in the second plug.

5. The device as set forth in claim 1 wherein an annular recess is provided in said valve face and an O-ring is seated in said annular recess and sized to extend outwardly of said valve face toward said shoulder and said recess being disposed in said face such that when the valve member is urged into said sealed position, the said O-ring sealingly engages said shoulder and together with said face and said shoulder comprises said seat for said valve member.

6. The device as set forth in claim 1 wherein the terminal end of said sleeve includes a pair of axially extending slots from the terminal end face thereof and said plunger includes an enlarged diametrical portion sized for companionate receipt and slidable axial movement in said slot, said slot extending depthwise from the plunger end of said housing a distance more than the distance from said seat to said second openings of said valve housing, and the length of said cable from its connection to said valve member and to the plunger being of a sufficient length such that the face of the valve member and the seat are in sealing engagement when said enlarged portion of said plunger is resting on the depthwise terminus of said slots, and whereby the plunger and cable are adapted to be moved axially relative to said cable housing and said plunger rotated to hold said plunger and enlarged portion out of said cylindrical housing with the enlarged portion dwelling on the end face.

7. The device as set forth in claim 6 wherein the end face is provided with a notch to provide a seat for the enlarged portion.

References Cited

UNITED STATES PATENTS

| 1,557,390 | 10/1925 | Tolk et al. | 251—294 X |
| 1,818,123 | 7/1931 | Engbrecht | 251—144 X |
| 1,995,174 | 3/1935 | Gerrard et al. | 251—144 X |

FOREIGN PATENTS

| 410,337 | 3/1925 | Germany. |

WILLIAM R. CLINE, Primary Examiner

U.S. Cl. X.R.

251—294